Dec. 29, 1970   P. L. BROWN   3,550,317
ELECTRIC TOP
Filed Jan. 21, 1969

INVENTOR
PAUL L. BROWN
BY *Arlington L. White*
ATTORNEY

# United States Patent Office 3,550,317
Patented Dec. 29, 1970

3,550,317
ELECTRIC TOP
Paul L. Brown, San Francisco, Calif.
(982 Lakeview Way, Redwood City, Calif. 94062)
Filed Jan. 21, 1969, Ser. No. 792,540
Int. Cl. A63h 1/00
U.S. Cl. 46—243                                8 Claims

ABSTRACT OF THE DISCLOSURE

The invention comprises means for effecting three different movements in an electric top upon actuation thereof; said means comprising a base for supporting the top in an upright position on a hard horizontal surface during spinning thereof, a ball bearing unit in said base with a plurality of bearings projecting below the bottom of said base upon which the top moves randomly about on the hard horizontal surface, an electrical circuit, a motor connectable into said circuit, a battery connected to said motor for driving the same and connectable therewith into said circuit, a central vertically disposed column housing said motor and said battery, resilient means for closing and opening said circuit to effect, respectively, the actuation of the top and the cessation of operation of the top, together with a transulcent body extending about said central column, a motor shaft on said motor projecting vertically and axially of said body and connected thereto for rotation with said shaft upon actuation of said motor, and contrasting indicia on said column and on said body which simulate animation upon rotational movement of the top.

---

While there have been a number and variety of gyrocopic tops, including electrical and other types of stringless, spinnable tops heretofore devised and marketed, such as the electrical top of U.S. Pat. No. 1,856,514 employing electromagnets, the gyroscopic top described and claimed in U.S. Pat. 2,762,162 wherein a friction element is provided on a rotor shaft and such element is rolled over a surface to set the rotor in motion, as well as the electric gyroscope top of the U.S. Pat. No. 3,137,093 employing a plurality of dry batteries for energizing a motor to rotate a flywheel shaft or rotor, and the self-propelled top described and claimed in U.S. Letters Pat. No. 3,253,365 utilizing batteries and a motor drivingly connected thereto, many of these prior spinable tops are impractical because of their complex construction and assembly resulting in lack of balancing, excessive manufacturing costs and poor performance. The present invention is directed to the provision of an energy driven top which does not depend upon centrifugal force to maintain the spinning top in upright position, which obviates all of the disadvantages exhibited in prior art top construction and assembly, and which affords movements not heretofore attained in spinning tops.

A primary object of my present invention is to provide an improved electric top which affords different spinning speeds for different components of the top as well as an independent movement of the entire assembly.

Another important object of the invention is to provide an improved electric top of the indicated nature which is additionally characterized by such weight placement and action of certain components thereof as to relieve the prime mover of an appreciable amount of the dynamic load thereon, thereby increasing the longevity of use thereof.

A still further object of my present invention is to provide an improved electric top of the aforementioned character is eminently safe to play with and which additionally affords enjoyable animated objects or scenes engendered by the variable spinning actions of different top components bearing contrasting indicia.

A still further object of my present invention is to provide an improved electric top of the indicated nature and character which is relatively inexpensive to manufacture, assemble and maintain.

Other objects of the invention, together with some of the advantageous features thereof, will appear from the following description of a preferred embodiment as well as of a modified embodiment of the invention which are illustrated in the accompanying drawings. It is to be understood, however, that I am not to be limited to the precise embodiments illustrated, nor to the precise arrangement of the components thereof, as my invention, as defined in the appended claims, can be embodied in a plurality and variety of forms.

Referring to the drawings.

In its preferred form, the electric top of my present invention preferably comprises self-contained means for supporting the top in an upright position during spinning thereof and for effecting random movement thereof about a relatively hard level surface, an electrical circuit including a direct current motor and a battery connected to said motor, together with a casing housing said motor and said battery, an electrical contact on said casing for completing said circuit, a translucent body surrounding said casing and supported on the shaft of said motor for rotation therewith, means permitting movement of said motor and said battery within said casing in two opposite directions to close said circuit and to open said circuit by engaging and disengaging said electrical contact on said casing thereby effecting rotational movement of said casing as well as said translucent body at different rates of rotation and cessation of rotations of said casing and said translucent body, and contrasting indicia on said casing and on said body which, upon rotation thereof simulate animation.

Figure 2:
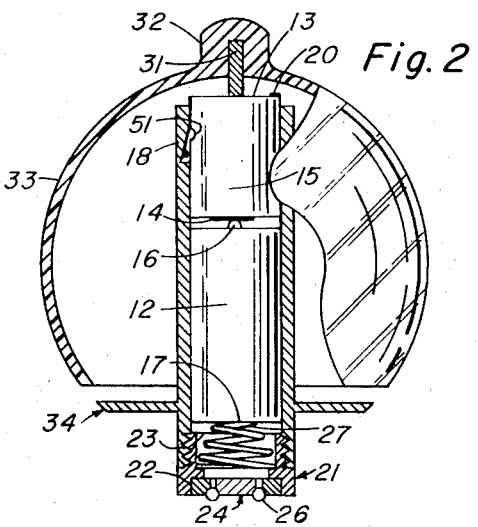
FIG. 2 is another front elevational view, partly in section and partly broken away to illustrate the construction.
Figure 6:
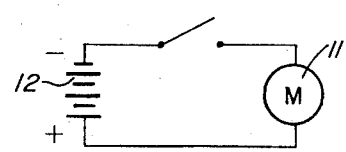
FIG. 6 is a diagrammatic view of an electrical circuit for the embodiments of the invention illustrated.

In accordance with my invention, I provide electrical power means in an electrical circuit for effecting the spinning of the top whenever desired as well as for stopping the spinning at will. The electrical circuit is diagrammatically shown in FIG. 6 and includes a direct current motor 11 which derives its driving energy from a conventional storage battery 12, the circuit including electrical contacts 13 and 14 at opposite ends of a motor casing 15 which are caused to be engaged and disengaged as hereinafter explained. As illustrated in FIG. 2 of the annexed drawings, the motor and battery are slidably mounted within a hollow central column 18 of the top which is arranged axially thereof and supported in upright position. An electrical contact strip 19 of electrical conductive material is affixed to an inner wall of column 18 and is fashioned with an inturned flange 20 at the top thereof for engagement at its flanged end with the metal contact 13 of the motor casing and with the contact 17 of the battery 12 when the two elements consisting of the motor 11 and battery 12 are elevated to their extreme upper positions with the motor casing contact 14 in engagement with the electrical contact 16 of the battery. In this elevated position of the connected battery and motor, the electrical circuit is completed for spinning the top. Upon lowering of the connected battery and motor from the latter's engagement with the flange 20 of electrical contact strip 19 the circuit is broken or opened and the top will stop spinning.

Figure 3:
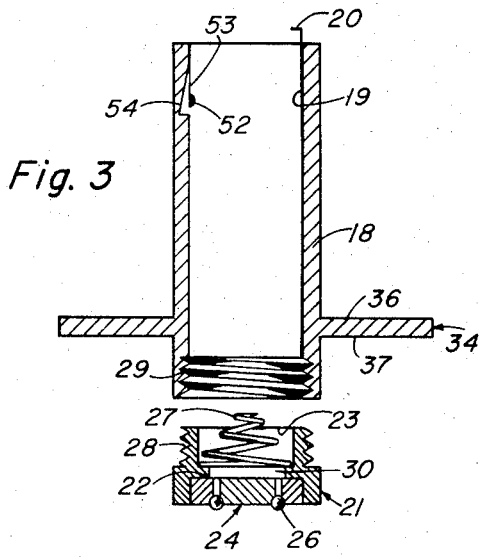
FIG. 3 is an enlarged exploded view of certain components of the embodiment shown in FIGS. 1 and 2.

As illustrated particularly in FIG. 3 of the drawings, I provide means for supporting the top in an upright position during the spinning thereof as well as for causing random or erratic linear movements of the top while spinning on a relatively hard surface such as a wood floor or concrete pavement. These means include a relatively flat base 21 which is fashioned with a cut-out section 22 in the bottom thereof opening outwardly, as well as a cavity 23 in the upper surface thereof, opening outwardly as shown. Press-fitted or otherwise removably secured within open section 22 of the base is a ball-bearing unit 24 including a plurality of ball-bearings 26 which project beyond the base and on which the top rides and is supported in an upright position during spinning thereof on a hard level spinning surface over which the spinning top moves erratically or randomly.

The cavity 23 of base 21 serves to receive and retain a compression spring 27 upon which the battery 12 seats; the resiliency of the spring permitting vertical movement of both the motor 11 and battery 12 within central column 18 whereby the electrical circuit is caused to close when these units are lifted to their extreme upper limit and is caused to be opened when such motor and battery are caused to be lowered to their extreme lower limits in which case the spring 27 is compressed. External and internal threads 28 and 29 are conveniently provided on the column 18 and base 21 so that these parts can be disconnected for replacement of a dead battery with a live battery. In the embodiment of my invention shown, the base 21 is fabricated of a metal and its upper surface engages the metal electrical contact strip 19 to complete the electrical circuit between the lower contact 17 of the battery through wire compression spring 27 which supports the battery to keep its upper contact 16 in engagement with the lower electrical contact 14 of motor casing 15 at all times. As stated, the electrical circuit is closed when the motor and battery are raised so that the upper contact 13 of motor casing 15 engages the flange 20 of contact strip 19. The lower extremity of compression spring 27 is fitted into and held by an edge of an opening 30 in the upper surface of the base 21 thus to confine the spring 27 between the bottom of the battery 12 and base 21.

As illustrated particularly in FIG. 2 of the annexed drawings, an extended motor shaft 31 is provided on motor 11 and the same are so arranged within the column 18 as to cause the shaft 31 to project vertically and axially of the spinnable top with its upper end press-fitted into an enlarged boss 32 defining a cap portion of a translucent body which is designated generally by the reference numeral 33 and which can take any desired shape and dimensions. In the embodiment shown, the body 33 is generally dome-shaped although open at the bottom thereof. With the electrical circuit closed, which can be effected by lifting the body 33 by means of grasping and pulling up on the cap portion 32 thereof which, in turn, lifts the motor 11 and connected battery 12 so that the motor contact 13 engages the flange 20 of contact strip 19 of the central housing 18, the translucent body 33 will be rotated with the rotating motor shaft 31. As the rate of rotation increases after overcoming the inertia of the top, the spinning body 33 will cause the entire top to move about on the relatively hard surface upon which it is placed, riding somewhat randomly or erratically upon its ball bearings 26. The rotation of motor 11 and its shaft 31 will cause a rotation of the column 18 because of the frictional engagement between the inner wall of the housing or column 18 and the casing of motor 11, although the rotation of column 18 will be at a lesser rate of rotation than that of the translucent body 33 because of the weight of the motor 11 and its connected battery 12 and the drag over the ball-bearings 26 on the underlying surface on which the top is spinning. The electrical circuit can readily be opened and the spinning of the top stopped by placing the palm of the hand on the upper end of the cap 32 of body 33 and depressing the same, causing the motor contact 13 to be disengaged from the flange contact 20. In order to avoid accidental closing of the circuit and consequent drain on the battery 12 when the top is not in use, the base 21 can be partially unscrewed from the column 18 to relieve the pressure on spring 27 which normally is transmitted to the bottom of battery 12 with sufficient force to keep the battery and motor in an elevated position.

Figure 1:
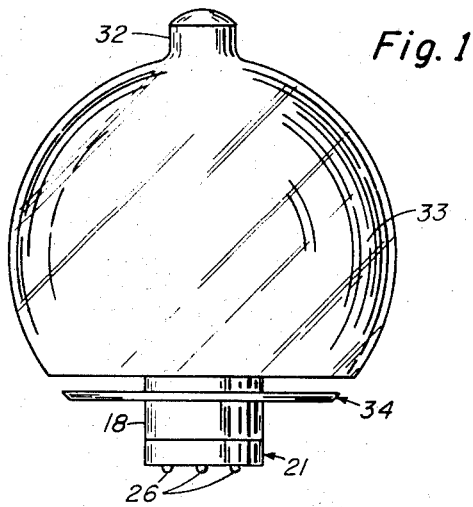
FIG. 1 is a front elevational view of a preferred embodiment of the invention.

In accordance with my present invention, there is provided either integral with the column 18 or separate therefrom and cemented or otherwise fastened thereto adjacent the bottom thereof a picture disc 34 which extends radially therefrom as shown in FIGS. 1 to 3 inclusive. Preferably, although not necessarily the disc 34 is circular in shape with a relatively flat top 36 and a flat bottom 37 thereon. In the embodiment of my invention shown in these three views, the disc 34 lies slightly below the bottom of translucent body 33 and the disc 34 rotates with the column 18 or at the same rate of rotation which, as stated above, is at a slower rate than the rate of rotation of the translucent body 33 during the spinning of the top.

Figure 4:
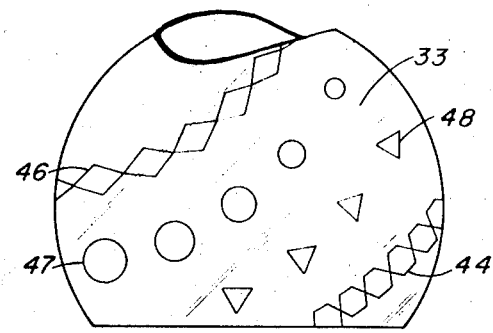
FIG. 4 is a fragmentary front elevational view of an outer body component, this view being a composite showing of variable and contrasting indicia which may be delineated upon an outer surface of the body component.
Figure 5:
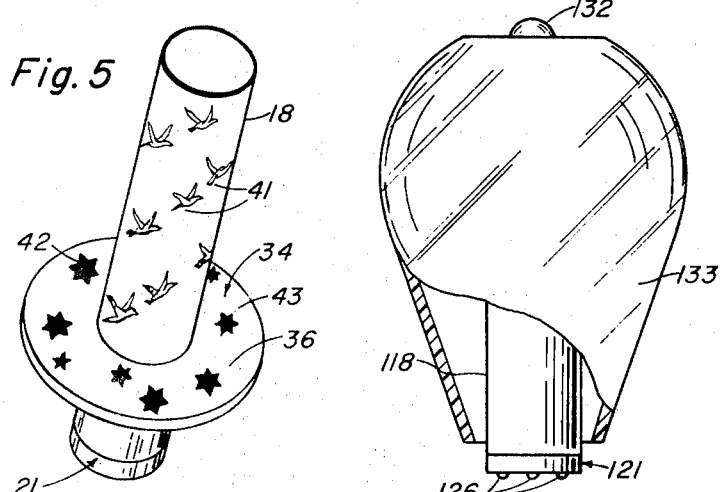
FIG. 5 is a front perspective view of an interior column and picture disc component of a preferred embodiment of the invention showing contrasting indicia delineated on the column and disc which simulate animated objects and scenes during rotation of the top.

As illustrated particularly in FIG. 5, I delineate contrasting indicia 41 and 42 on the exterior surface of column 18 and the top surface of disc 34 respectively. Any desired contrasting indicia may be employed for these two components and, if desired, the indicium 41 delineated on the external surface of column 18 can be the same as the indicium 42 on the top surface of the picture disc 34. In the embodiment shown, the indicium 41 is to designate birds and the indicium 42 is to designate a number of stars in the heaven 43 which can be shown in the color blue. With these two components turning during the spinning of the top, the indicia 41 and 42 simulate birds in flight seen through translucent body 33, the external surface of the translucent body 33 can be delineated with a single indicium 44, such as a linked series of geometric figures, or with contrasting indicia 46, 47 and 48, see FIG. 4, which can be a continuous intersecting lines or spaced circles of different sizes or randomly located triangles of different sizes, respectively. The patterns 44 and 46 and 48 inclusive of the delineated indicia on translucent body 33 can, if desired, be the same indicia as that delineated on the column 18 and picture disc 34. Animated patterns of indicia on the translucent body 33 are created during the rotation of such body upon spinning the top.

It may be observed here that I provide means for releasably latching the motor casing 15 in an elevated position with the electrical contact 13 thereof in engagement with the flange 20 of electrical strip contact 19 thereby maintaining the electrical circuit closed and the spinning of the top. These means conveniently can comprise a notch 51 in the wall of the motor casing which receives the rounded tip 52 of a spring detent 53 which is secured to and suspended from the inner wall of the central column 18, see FIG. 3. The inner wall of column 18 is cut away, as at 54, to permit the inward movement of the spring detent 53 when the palm of the hand is pressed downwardly on the cap 32 of body 33 to stop the spinning of the top and the opening of the circuit by disengaging contacts 13 and 20 of the electrical circuit.

Figure 7:
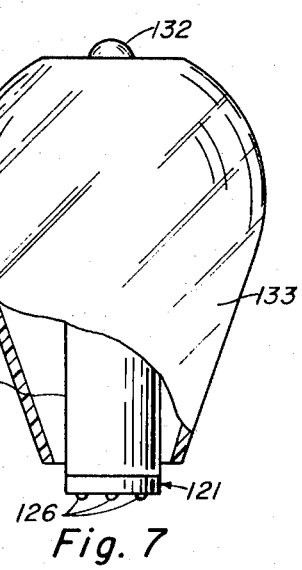
FIG. 7 is a front elevational view, partly broken away to illustrate parts, of a modified embodiment of the invention.

In FIG. 7 of the annexed drawings, I have illustrated a modified embodiment of the invention wherein all of the components of the embodiment of FIGS. 1 to 5 inclusive are incorporated including the ball bearings 126 projecting below the base 121 which is connected to a column 118 supported in upright axial position by and on the movable bearings, except the picture disc component which is omitted in this modification. Moreover, the outer translucent body 133 is elongated in respect to body 33 of the preferred embodiment of FIGS. 1 to 5 inclusive, and is of tapering shape extending nearly to the base 121. Other shapes of external translucent bodies for the top may, of course, be substituted. To close the electrical circuit the body 133 may be grasped in the hand and lifted whereby the motor and battery, not shown in this view, will be lifted to their extreme upper limits with the upper contact of the casing engaging the inturned metal flange of the electrical contact strip, all not shown in this view. To open the circuit and return the motor and battery to their extreme lower positions, the palm of the hand can press down on cap portion 132 of the body 133 to disengage the upper electrical contact of the motor casing from the flange of the electrical contact strip, as indicated in FIG. 3 but not shown in FIG. 7.

It is to be understood that the appeneded claims are to be accorded a range of equivalents commensurate in scope with the advances made over the prior art.

I claim:

1. An electric top having a plurality of different movements during spinning thereof comprising an electrical circuit, a direct current motor connectable into said circuit, a direct current battery connected to said motor and connectable therewith into said circuit, a column housing said motor and said battery, an electrical contact on said column for connecting said motor and said battery into said circuit, a motor shaft, a translucent body secured to said shaft and rotatable therewith; raising of said body effecting the raising of said motor and said battery within said column to close said circuit and lowering of said body effecting the lowering of said motor and said battery to open said circuit whereby spinning of said column and said body and cessation of spinning thereof respectively are accomplished, a base removably secured to said column for supporting the same in an upright position, and a series of roller bearings projecting below said base for riding upon a relatively hard surface with random linear movements of the top during spinning thereof.

2. An electric top as defined in claim 1, and a spring confined between the bottom of said battery and said base for movably supporting said battery and said motor within said column.

3. An electric top as defined in claim 2, and a cap on said translucent body for lifting and lowering said body relative to said base.

4. An electric top as defined in claim 2, and a picture disc on said column adjacent to said base, and indicia delineated on said column and said picture disc; said indicia simulating animation during rotation of said column and said disc upon spinning the top.

5. An electric top as defined in claim 4, and indicia delineated on the exterior surface of said body.

6. An electric top as defined in claim 4, and indicia on said translucent body contrasting with indicia on said column.

7. An electric top as defined in claim 1, and means for effecting relative movement of said battery and said motor as a unit in respect to said column.

8. An electric top as defined in claim 1, and releasable latching means for removably retaining said motor and said battery in elevated positions to maintain said circuit closed.

References Cited
UNITED STATES PATENTS

| | | | |
|---|---|---|---|
| 1,856,514 | 5/1932 | Sheneman | 46—243 |
| 2,255,454 | 7/1939 | Rust | 46—73 |
| 3,246,427 | 4/1966 | Tuuri | 46—243 |

LOUIS G. MANCENE, Primary Examiner

D. L. WEINHOLD, Assistant Examiner

U.S. Cl. X.R.

46—65